United States Patent [19]

Brioaud et al.

[11] Patent Number: 5,800,200

[45] Date of Patent: Sep. 1, 1998

[54] SMART CARD CONNECTOR WITH IDC

[75] Inventors: Herve'Guy Brioaud; Fabrice Valcher, both of Dole, France

[73] Assignee: ITT Manufacturing Enterprises, Inc., Wilmington, Del.

[21] Appl. No.: 669,754

[22] Filed: Jun. 26, 1996

[30] Foreign Application Priority Data

Nov. 7, 1994 [FR] France ................... 94-13288

[51] Int. Cl.⁶ ........................... H01R 13/38
[52] U.S. Cl. ................ 439/404; 439/405; 439/418; 439/630
[58] Field of Search ................ 439/404, 405, 439/417, 418, 630, 634

[56] References Cited

U.S. PATENT DOCUMENTS

| | | |
|---|---|---|
| 3,866,994 | 2/1975 | Elkins ................... 439/404 |
| 3,992,072 | 11/1976 | Anhalt et al. ........... 439/404 |
| 4,062,616 | 12/1977 | Shaffer et al. .......... 439/404 |
| 4,194,803 | 3/1980 | Hatch ................... 439/404 |
| 4,735,578 | 4/1988 | Reichardt .............. 439/152 |
| 4,752,234 | 6/1988 | Reichardt .............. 439/260 |
| 4,799,891 | 1/1989 | Reichardt .............. 439/43 |
| 4,891,019 | 1/1990 | Olsson ................. 439/404 |
| 5,242,314 | 9/1993 | Di Giulio et al. ....... 439/404 |
| 5,259,777 | 11/1993 | Schuder ................ 439/188 |
| 5,286,957 | 2/1994 | Defrasne ............... 235/441 |

FOREIGN PATENT DOCUMENTS

| | | |
|---|---|---|
| 0366513 | 7/1994 | European Pat. Off. . |
| 2351514 | 12/1977 | France . |
| 2019126 | 10/1978 | United Kingdom . |
| WO9518421 | 7/1995 | WIPO . |

*Primary Examiner*—J. J. Swann
*Attorney, Agent, or Firm*—Thomas L. Peterson

[57] ABSTRACT

A connector is provided for connecting contacts on the surface of a smart card to a read/write device, which includes an insulative housing (11) that holds a plurality of electrical contacts (32) that have card-engaging blades (34) for engaging pads on a smart card (C). Each contact has a wire-engaging end with an insulation displacement fork (54) for penetrating insulation of an electrical flat cable (66) to connect to a cable wire (70) that connects to a read/write device (D). In one connector, a support part (14) of the housing clamps a fixing part (42) of each contact against a cover (20), while a deflectable linking branch (50) of the contact extends at an upward incline to a bend (82) that extends to the fork (54). A tool T moved down through an opening (80) in the cover can deflect the linking branch to a deflected position, with the fork then projecting down through a cable. A shoulder (84) on the housing then resists upward fork movement. The cable can be supported by a cable-receiving wall (74) fixed to the support part (14).

10 Claims, 5 Drawing Sheets

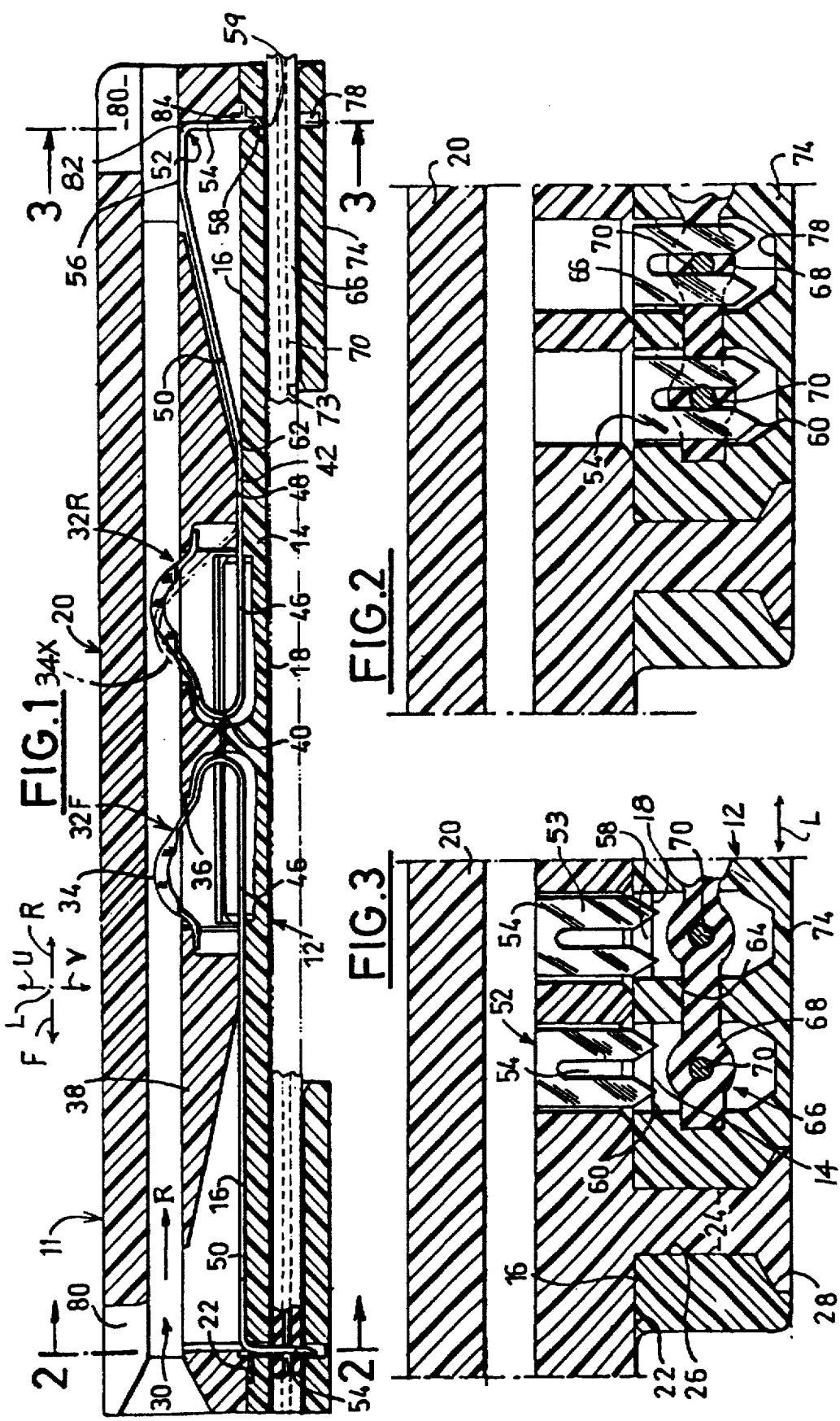

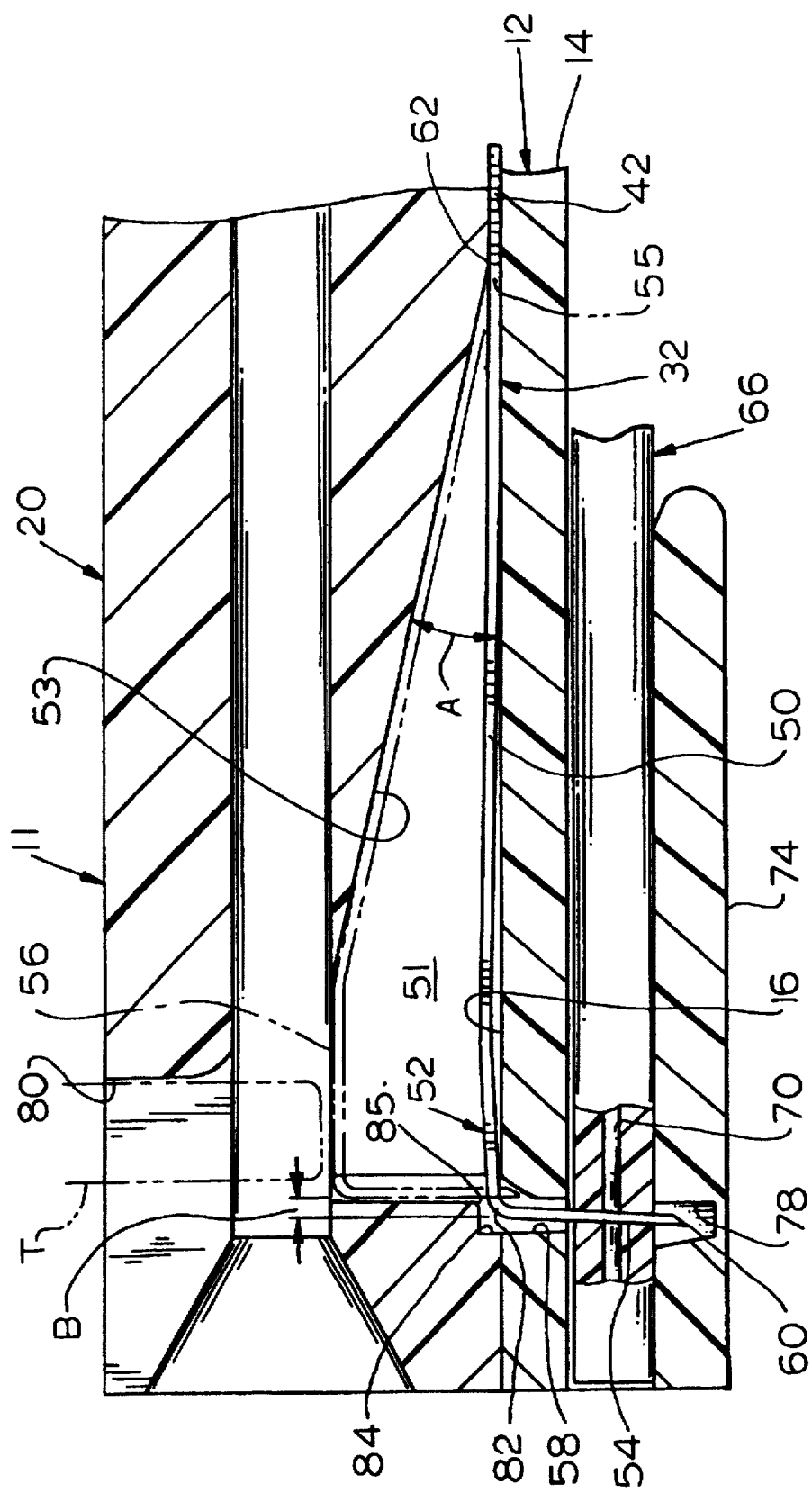

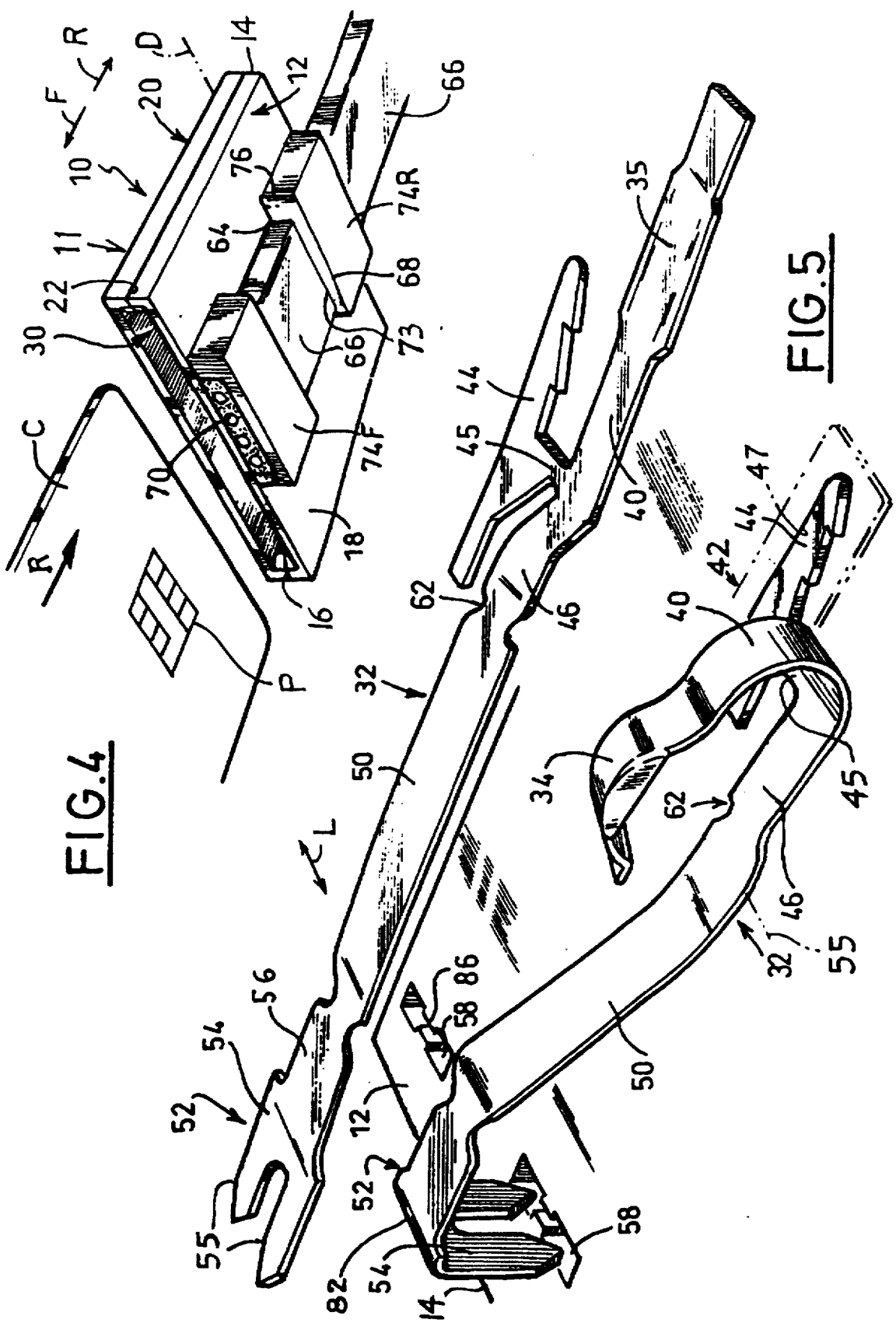

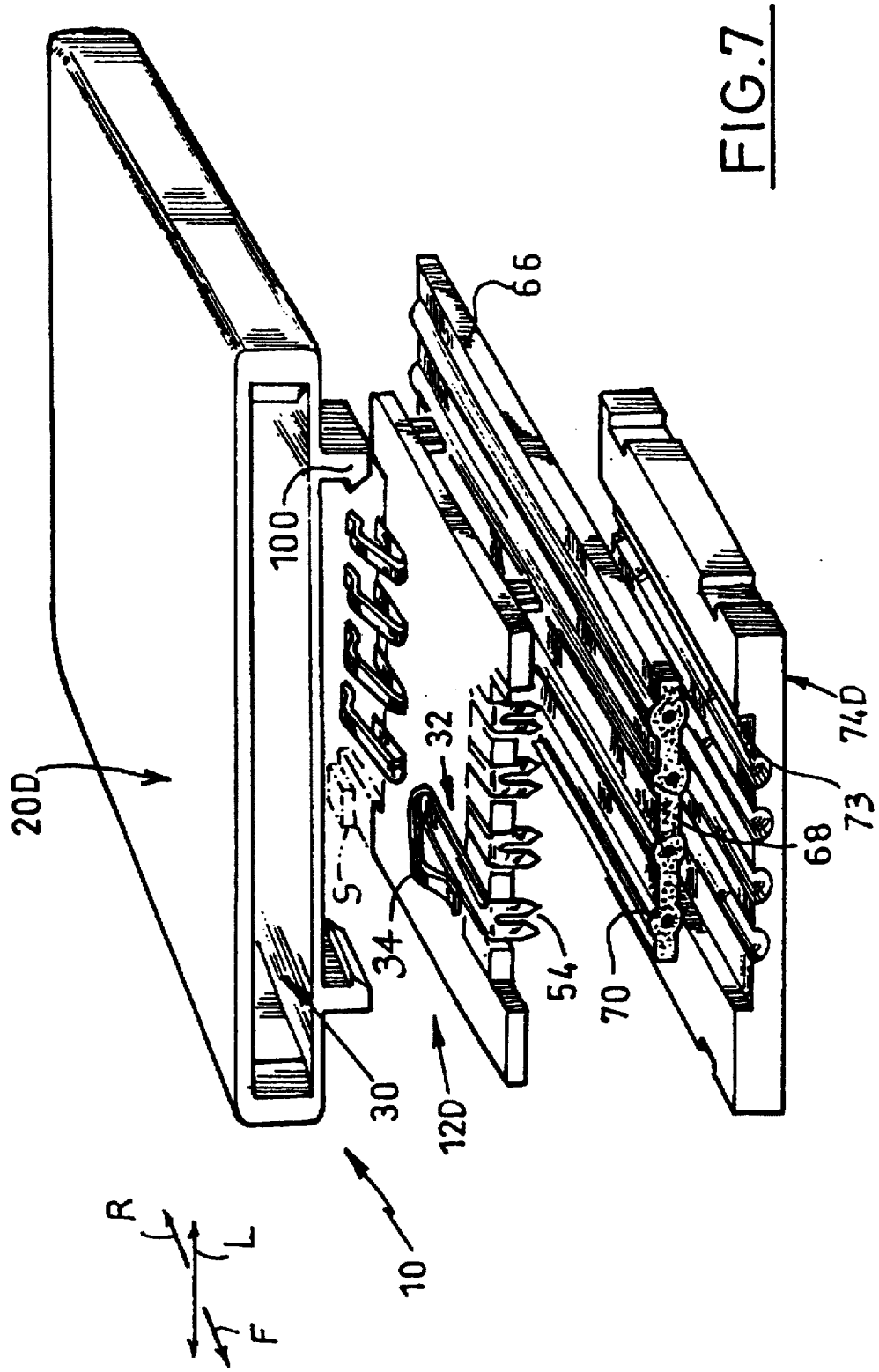

SMART CARD CONNECTOR WITH IDC

BACKGROUND OF THE INVENTION

This invention relates to an electrical connector for connecting electronic cards such as smart cards that each has electrical contact pads on one of its faces, to a read/write device. Such connectors include a molded insulative support and deflectable contacts that include blades for engaging the card. The termination ends of the contacts opposite the deflectable blades, must be connected to processing circuitry of the read/write device.

The most widely used design for such smart card connector is illustrated, for example, in documents EP-A-0,366,513 and WO-A-95/18421. The contact termination ends are generally made in the form of contact feet that are soldered to conducting traces on a circuit board of the read/write device. The circuit board also holds surface-mount electrical components.

In another design, the termination ends of the contacts are in the form of pins for soldering in plated-through holes of a circuit board, or for fitting into female contact elements of a separate connector, which is itself connected to an electrical cable extending to the read/write device. The later design has the advantage of allowing the card-receiving connector to be positioned remote from the read/write device. However, this arrangement increases the cost because of the requirement for an additional connector for connecting the contact connection ends to the cable, and the cost of assembling the parts. Also, this approach increases the overall size of the connector.

In one type of known design, shown in EP-A-0,214,478, the termination end of each contact has a fork for penetrating the insulation of a cable to engage a cable wire, using an insulation-displacement connection. This technique has been difficult to use because it requires an additional component to press and hold the contact forks against the cable.

SUMMARY OF THE INVENTION

In accordance with one embodiment of the present invention, a card-receiving connector is provided, which has an insulative housing and which has contacts with fixing parts that are fixed to the housing and with blades that engage the card. Each contact has a linking branch which extends at an upward incline from the fixing part to an insulation displacing fork. The fork can be moved down into insulation of a flat cable to engage a conductor therein, by deflection of the elongated linking branch. This allows the connector housing to include a cable-receiving lower wall that is fixed to the support part of the housing that fixes the positions of the contacts. A tool can be used to downwardly deflect the contact forks, and the connector can be constructed to hold the downwardly deflected forks in place. The connector forms a largely downwardly-facing shoulder that abuts the top of the fork at an elbow therein.

Each contact can include a harpoon-shaped catching foot that is received in a slot of the housing, with the catching foots lying in spaces between adjacent contacts of a set. The housing includes a separate cover, with the fixing parts of the contacts trapped between a lower surface of the cover and an upper surface of the support part. The cover has holes lying over the forks to receive tools or parts that depress the forks. Front and rear sets of contacts can be provided, with staggered forks. Each contact termination end is preferably offset laterally with respect to the card-engaging blade of the same contact, by a distance equal to one quarter of the pitch separating two adjacent contacts of a set. As a result, the card-engaging ends of pairs of front and rear contacts can be aligned.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional view of a card connector constructed in accordance with one embodiment of the present invention, with the contacts at the right side of the figure shown in an initial position and with the contacts at the left side of the figure shown in a connection position.

FIG. 1A is an enlarged view of the left side of FIG. 1.

FIG. 2 is a partial sectional view taken on line 2—2 of FIG. 1, showing two connection forks in their connection positions.

FIG. 3 is a sectional view taken on line 3—3 of FIG. 1, showing the connection forks in their initial positions.

FIG. 4 is a partial perspective view of the connector of FIGS. 1–3, and showing a portion of a card that can be inserted therein.

FIG. 5 is a perspective view of two contacts, with one contact having the fully folded shape shown in FIG. 1, and the other contact being in a shape that it has prior to folding.

FIG. 7 is an exploded prospective view of a connector constructed in accordance with a third embodiment of the invention.

DETAILED DESCRIPTION OF THE INVENTION

Figure 6:
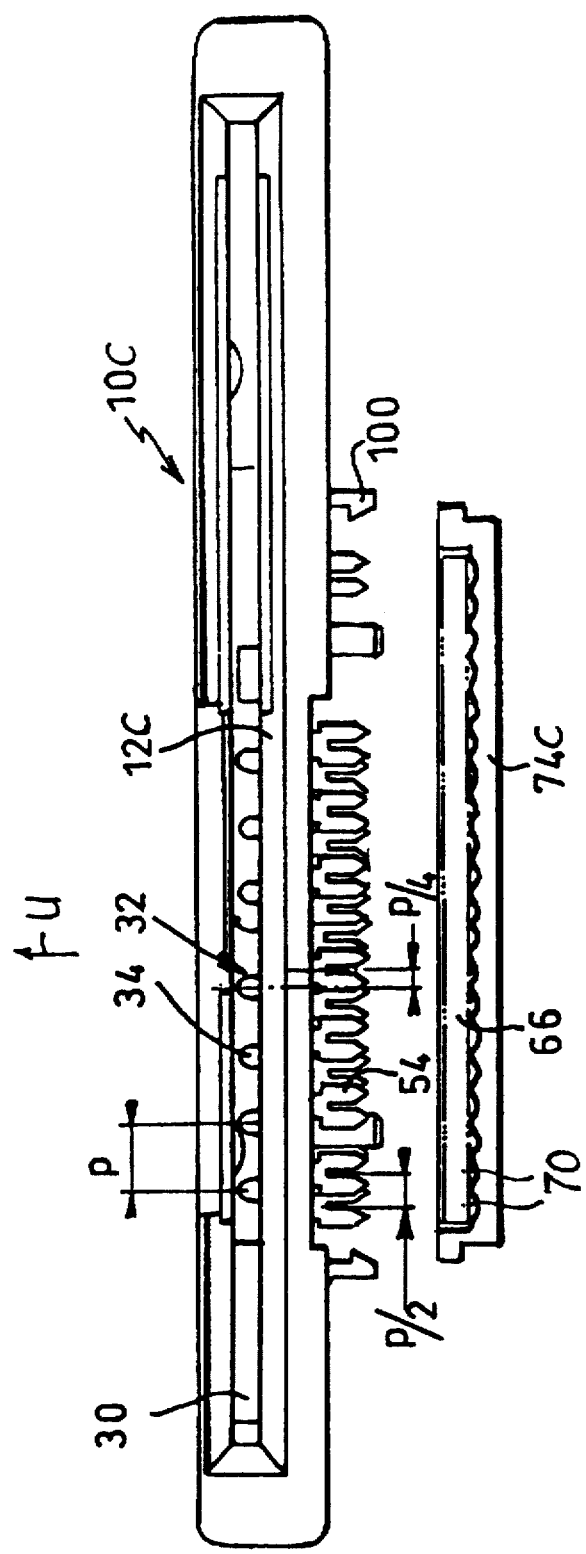
FIG. 6 is a front elevation view of a connector constructed in accordance with a second embodiment of the invention.

FIG. 4 shows an electrical connector 10 with a slot 30 for receiving a smart card C, for connecting contact pads P on the smart card to a read/write device D. The device D includes circuitry for processing data contained in the card C and for writing data into the card. The connector 10 includes a primarily insulative housing 11 that includes a support 12 and a cover 20. The support 12 includes lower walls 74 comprising forward and rearward cable-receiving walls 74F, 74R which each receives a portion of a flat cable 66 that connects the connector 10 to the device D. The card is inserted into a cable-receiving slot 64 in a rearward longitudinal direction R, and the cable 66 extends rearwardly from the connector.

As shown in FIG. 1, the support 12 serves to support two groups of contacts 32F, 32R. Each contact has a strip or blade-shaped section 34 that is designed to electrically connect to pads on the card, which is shown in the prior art in WO-A-95/18421. Each contact such as 32R is formed of sheet metal and has an elongated shape in the longitudinal directions F, R. The blades or card-engaging ends 34 project into the card-receiving slot 30 through blade-passing openings 36 that are formed in a lower part 38 of the cover to engage corresponding card pads. FIG. 1 shows another blade design in phantom lines at 34X, which does not have a loop or hairpin-shaped portion 40.

As shown in FIG. 5, each card-engaging end 35 is connected by a largely 180° loop or hairpin-shaped portion 40 to a fixing part 42 of the contact, which includes a harpoon-shaped catching foot 44 and one end of a bearing foot 46, connected together by a crosspiece 45. Each catching foot 44 is designed to be received in a slot 47 in a plate-like support part 14 shown in FIG. 1, by movement in a longitudinal direction into place. Each bearing foot 46 of the fixing part bears partly on a flat portion of the upper face 16 of the plate-like support part 14, and is pressed thereagainst by a portion 48 at the lower face 22 of the cover 20. This traps the contact in place between the plate 14 and the cover 20.

As shown in FIG. 1A, each contact 32 includes a primarily longitudinally-extending linking branch 50 with a free end section 52. The free end section includes a largely 90° bend 82 and a downwardly-extending connection fork 54 of the insulation-displacement type. Prior to connection to a ribbon cable 66, each linking branch 50 extends in a rest position, shown in phantom lines in FIG. 1A. In the rest position the linking branch lies in a space 51 formed by housing walls 53 that are fixed with respect to the cable-holding walls 14, 74 of the housing. Also, in the rest position, each linking branch 50 it extends at an upward incline from the fixing part 42 to the bend at 82, with the upward incline being an acute angle A that is preferably no more than 30°. As a result of the bend 82, while the terminal part 56 of a contact free end section 52 extends primarily horizontally, the fork 54 extends primarily vertically.

The fork 54 has a lower end with points 60 that lie in a slot 58 formed in the plate-part 14 of the support 12. In the rest position of the contact shown in phantom lines in FIG. 1A, the lower points of the fork lie below the upper face 16 of the plate 14. Each contact linking branch 50 can be downwardly deformed about pivot axes such as 55 lying near a contact connection region 62 at an end of the linking branch opposite the fork 54. The linking branch can be pivoted down to the position shown, so the fork 54 moves largely through the cable 66 and into a slot 78 in the cable-receiving wall 74.

In the connection position shown in FIG. 2, each of the forks 54 lies in the recess or slot 78 and penetrates the cable 66. The cable 66 is a flat cable with flat insulation 68, with electrical conductors or wires 70 embedded in the cable insulation.

As can be observed in FIG. 5, each fork 54 is laterally offset, in the lateral direction L with respect to the card-engaging end 34 of the contact. The offset occurs primarily at the bearing foot 46. The offset is equal to p/4, with FIG. 6 showing that p is the pitch of contacts lying at the same end of the connector, or in other words, the center-to-center distance between adjacent contacts at one end of the connector. The pitch of the cable wires indicated at 70, is p/2. The forks of the contacts at the rear of the connector, engage every other, or alternate, cable conductors 70. The forks of the contacts at the front of the connector engage the other alternate contacts that are not engaged by the forks of the rear contacts. The offsetting of the front and rear of each contact, allows the same contacts to be used at the front and rear of the connector, with their fork ends offset but their card-engaging ends aligned (that is, the card-engaging end of one forward contact is aligned with the card engaging end of one rear contact).

The cable-receiving walls 74 or 74C form longitudinally-extending channels open at both ends of the connector, with each channel having a lower end that is shaped to be substantially complimentary to that of the insulation 68 of the cable 66. FIG. 3 shows that the lower walls 74 (including 74F and 74R) are molded integrally with the support part 14 of the support 12, so they are permanently fixed together. FIG. 3 shows studs 24 extending down from the cover 20, with the lower ends of the studs being deformed to form heads 28 that lock the support 12 to the cover 20.

FIG. 1 shows that the cover 20 includes, near its front and rear ends, apertures 80 through which parts or connection tools can be lowered, to push down the insulation-displacement forks 54 on the contact free end portions 52. The forks remain down by high friction with the walls of the slot 58 and by high friction with the cable insulation and conductors that the fork penetrates. Where the forks engage the walls of the slot 58, such friction also helps to hold down the fork.

In accordance with the present invention, the cover 20 shown in FIG. 1A, is formed with a cutaway 84 that forms a retain surface comprising a shoulder 85 that can abut the elbow or bend 82 of a downwardly-deflected contact free end portion 52, to strongly resist upward movement of the fork and therefore form a means for locking said fork in a downward position. It may be noted that during downward movement of the free end portion 52, when the linking branch 50 pivots near the fixing portion 42, the fork 54 shifts a small horizontal distance B away from the fixing portion 42. The linking branch 50 and other portions of the contact can resiliently deflect to allow the fork 54 to move down through the slot 58. In the downward and horizontally shifted position, the elbow 82 lies under the shoulder 85. The linking branch 50 is shown extending at an upward incline A of 15° so there is only moderate rearward displacement of the fork as the linking branch pivots to near the horizontal. The linking branch 50 can buckle as it pivots down, to allow the fork to move through the slot 58.

The connector 10 is connected to the ribbon cable 66 by first moving the cable in a forward direction F (FIG. 4) to thread it through the lower walls 74R and 74F. Tools T are moved down through the apertures in the cover to push down the forks until they lie in their connection positions shown at the left side of FIG. 1, as well as in FIG. 2.

As shown in FIG. 5, the slot 58 through which the contact forks 54 can project, include guide ribs 86. The guide ribs are positioned to lie in the space between the two tines 55 of each fork, to guide the forks into position and resist their sideward bending.

FIG. 6 shows a modified connector 10C, with most parts similar to those of FIGS. 1–5. However, a cable-receiving wall 74C is in the form of an attachable element. That is, the manufacturer of the connector provides a separate cable-receiving wall 74C in which a cable can be laid, with the wall then moved upward in direction U until opposite sides of the wall 74C snap into place on hooks 100. This can be compared to the design of FIGS. 1–5 wherein the cable-receiving walls 74R, 74F are permanently fixed in place by the manufacturer of the connector, so the customer who is to install the cable, must thread the cable through cable-receiving recesses or passages 73 formed between the cable-receiving wall and the plate-like support part 14 of the connector. An advantage of the construction shown in FIG. 6, is that the connector can mate to cables 66 of different thicknesses, by the use of a cable-receiving wall 74C with hook-engaging latches of different heights.

FIG. 7 shows another embodiment of the invention, wherein most of the parts are similar to those of FIGS. 1–5. In FIG. 7, a bearing plate 74D is a part to be attached by the customer who buys the connector, with the wall 74D being snap-fastened to hooks 100 on a cover 20D. The cable is laid in a recess 73 of the wall 74, and the wall is pressed upwardly and held by the hooks 100. The contact-holding support 12D can be fastened to the cover 20D using the same hooks 100 or other hook-like latches. This design enables a support 12D with contacts 32 thereon, of different models, to be used. For example, some supports 12D with contact can include switches S for detecting full insertion of a card, with the terminals of such switch connected to cable wires through the same form of contact wire engaging ends as those shown at 32. A variety of attaching devices including screws can be used to connect the different parts together.

Although the invention has been described for use with smart cards C inserted by movement in a rearward direction R to deflect contact blades, there are situations where cards are fully inserted and contacts are "landed" by movement of the card, or where the contact blades of the contact move against a card after it is fully inserted, with a structure for deflecting the contacts against the cards being mountable on the separate support 12D of FIG. 7.

While terms such as "upward", "downward", "horizontal", etc. have been used to describe the invention as illustrated, it should be understood that the connector can be used in any orientation with respect to Earth.

Thus, the invention provides a card connector for connecting card contact pads to a read/write device, through a flat cable or ribbon cable. In one construction, the cable is threaded through a passageway whose upper and lower walls are permanently fixed to each other at the manufacturer of the connector, as by being integrally molded. Each contact has a linking branch which can be pivoted down to move down an insulation-displacing fork into or through the cable while longitudinally shifting the fork. The connector forms a shoulder that abuts a bend in the connector if the fork tends to lift up, to keep it in position. In another construction, a separate cable-receiving wall is provided, on which the cable can be laid, and then lifted with the wall into position, while fixed contact forks penetrate the cable. Different cable-receiving walls can be used with flat cables of different thicknesses. A support on which the cables are mounted, can be detachably mounted to a cover, so that different supports can be used with accessories such as a switch that detects full insertion of card.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A card connector comprising:
   a housing having a portion for holding a cable with insulation and at least one wire therein;
   at least one contact mounted in said housing, said contact having a fixing portion that is fixed to said housing, a linking branch that extends at an upward incline from said fixing portion, a largely downwardly-extending insulation displacement fork lying at an end of said linking branch opposite said fixing portion, and an elbow between said linking branch and said fork;
   said linking branch being downwardly deflectable to substantially the horizontal to move down said fork into said cable, and said housing including a largely downwardly-facing shoulder that is fixed in position with respect to said housing portion, with said shoulder positioned to allow said fork to pass downwardly across said shoulder and to thereafter lie over said elbow when said fork is moved down into said cable, to prevent the fork from moving up out of said cable.

2. A card connector which includes a housing with a card slot for receiving a card that has a card face with contact pads thereon, and a plurality of contacts mounted on said housing and having contact blades for engaging the card contact pads, wherein said housing has a cable-receiving recess for receiving a flat cable with conductive wires within cable insulation, for connecting to a read/write device, and each of said contacts has a termination portion with an insulation displacement fork for penetration of said cable insulation to engage one of said wires, wherein:
   said plurality of contacts includes a front set of contacts and a rear set of contacts, with the contacts of said front and rear sets being substantially identical, but turned 180° about a vertical axis from each other;
   the contacts of each set are laterally spaced by a pitch p, and the forks of the contacts of the front and rear set are laterally staggered so the forks of said front contacts are positioned to engage every other wire of a cable and the forks of the rear contacts are positioned to engage the cable wires not engaged by the forks of the front contacts, when a cable is installed that has wires laterally spaced at a pitch of p/2;
   the blade of each contact is laterally offset from the fork of the contact by a distance p/4, with the blade of each of a plurality of rear contacts being laterally aligned with a blade of a front contact.

3. A card connector comprising:
   a housing having a portion for holding a cable with insulation and at least one wire therein;
   at least one contact mounted in said housing, said contact having a fixing portion that is fixed to a portion of said housing, a linking branch that extends at an upward incline of about 15° from said fixing portion, a largely downwardly-extending insulation displacement fork lying at an end of said linking branch opposite said fixing portion, and an elbow between said linking branch and said fork;
   said linking branch being downwardly deflectable by a force applied to it, to move down said fork to an engaged position to engage said cable, and said housing including retain means that is fixed with respect to said portion of said housing for maintaining said fork in said engaged position.

4. A card connector which includes a housing and a plurality of contacts mounted on said housing, wherein said housing has a cable receiving recess for receiving a flat cable having conductive wires lying within a cable insulation, and each of said contacts has a termination portion with an insulation displacement fork that includes a pair of tines and a space between said tines for penetration of said cable insulation to engage one of said wires, wherein:
   each of said contacts includes a fixing portion fixed to said housing and a linking branch extending between said fixing portion and said termination portion, said linking branch initially positioning said fork above said cable-holding recess with the fork extending primarily downward, and said linking branch being downwardly deflectable relative to said housing to move down said fork relative to said housing, along a downward path largely through said cable to engage one of said wires;
   said housing includes a largely plate-like support part and a lower cable-receiving wall fixed to said support part, with said support part having a plurality of fork-passing slots with lower slot ends opening to said cable-receiving recess, and with each of said forks having a lower end aligned with one of said fork-receiving slots in said initial position;
   each of said fork-receiving slots has at least one guide rib (86) positioned to lie between the pair of tines of the fork at least during downward movement of the fork.

5. A card connector which includes a housing and a plurality of contacts mounted on said housing, wherein said housing has a cable receiving recess for receiving a flat cable having conductive wires lying within a cable insulation, and each of said contacts has a termination portion with an insulation displacement fork for penetration of said cable insulation to engage one of said wires, wherein:

each of said contacts includes a fixing portion fixed to said housing and a linking branch extending between said fixing portion and said termination portion, said linking branch initially positioning said fork above said cable-holding recess with the fork extending substantially downwardly, and said linking branch being downwardly deflectable to allow said fork to move down along a downward path largely through said cable to engage one of said wires;

said housing extends along vertical, lateral, and longitudinal directions which are mutually perpendicular to each other;

in each of said contacts, the linking branch is bendable substantially about a laterally-extending axis (55) that lies near where the linking branch joins to the fixing portion, and the linking branch extends longitudinally and at an upward incline away from said fixing portion and from said axis;

for each of said contacts, said housing has a retain surface (85) for preventing upward movement of each of said forks, with said retain surface substantially fixed to the rest of said housing and lying adjacent to the downward path of the fork and at about the same height as each of said axes, and for each contact, as the linking branch bends substantially about said axis and said fork moves primarily downward, the top of said fork reaches a position partially under said retain surface so said retain surface resists upward movement of the fork.

6. The card connector described in claim 5 wherein:

in said initial position of said linking branch, said retain surface (85) lies longitudinally at least about as far from said axis as said fork, and when said fork has moved down said retain surface has a part that lies closer to said axis than a part of said fork, for each of said contacts.

7. The card connector described in claim 5 wherein:

said termination portion of each contact has a substantially 90° bend, with said fork extending up to said bend;

said housing has a shoulder that forms said retain surface, with said shoulder lying over said bend when said fork has been pressed fully down, so said shoulder can abut said bend to resist upward movement of the fork.

8. A card connector which includes a housing and a plurality of contacts mounted on said housing, wherein said housing has a cable receiving recess for receiving a flexible flat cable having conductive wires lying within a cable insulation, and each of said contacts has a termination portion with an insulation displacement fork for penetration of said cable insulation to engage one of said wires, wherein:

said plurality of contacts include front and rear sets of contacts with forks;

said housing has a largely plate-like support part (14) and has lower card-receiving walls (74) fixed to said support part, to leave said cable-receiving recess between them, with said lower cable-receiving walls including spaced front (74F) and rear (74R) lower walls forming a pair of aligned cable-receiving recess portions, whereby to facilitate insertion of a flexible flat cable.

9. A card connector which includes a housing and a plurality of contacts mounted on said housing, wherein:

said housing includes a plate-like support part with a plurality of slots, with said contacts having termination portions with insulation displacement forks vertically aligned with said slots;

said housing also including a cable-receiving lower wall which is permanently fixed to said support part and forming a cable-receiving passage between said lower wall and said support part, with at least an end of said passage being open to enable a flat cable to be inserted therein;

each of said contacts including a fixing portion fixed to said housing support part, and a linking branch which extends from said fixing portion to said termination portion, with said linking branch being bendable to allow said fork to be forced down through one of said slots and into said cable-receiving passage to pass largely through a cable lying in said passage;

said housing having walls forming a space that holds said linking branch, with said walls being fixed to said cable-receiving lower wall to allow said linking branch to be bent so it extends substantially horizontal without bending or pivoting part of said housing.

10. A card connector which includes a housing and a plurality of contacts mounted on said housing, wherein:

said housing includes a plate-like support part with a plurality of slots, with said contacts having termination portions with insulation displacement forks vertically aligned with said slots;

said housing also including a cable-receiving lower wall which is permanently fixed to said support part and forming a cable-receiving passage between said lower wall and said support part, with at least an end of said passage being open to enable a flat cable to be inserted therein;

each of said contacts including a fixing portion fixed to said housing support part, and a linking branch which extends from said fixing portion to said termination portion, with said linking branch being bendable to allow said forks to be forced down through one of said slots and into said cable-receiving passage to pass substantially through a cable lying in said passage;

said housing including means fixed with respect to said cable-receiving lower wall for locking said fork in a downward position.

* * * * *